(12) United States Patent
Miyake

(10) Patent No.: US 6,188,490 B1
(45) Date of Patent: Feb. 13, 2001

(54) PRINT PROCESSING DEVICE FOR IMAGE DATA EDITING

(75) Inventor: Kiyoshi Miyake, Kobe (JP)

(73) Assignee: Minolta Co., Ltd., Osaka (JP)

( * ) Notice: Under 35 U.S.C. 154(b), the term of this patent shall be extended for 0 days.

(21) Appl. No.: 09/173,600

(22) Filed: Oct. 15, 1998

(30) Foreign Application Priority Data

Oct. 17, 1997 (JP) .................................................. 9-284809

(51) Int. Cl.[7] .................................................. G03G 15/00
(52) U.S. Cl. ........................... 358/1.18; 358/1.2; 358/452
(58) Field of Search .................................. 382/284, 298; 358/450, 451, 452, 1.2, 1.17, 1.18; 345/127, 129, 439; 707/525, 910

(56) References Cited

U.S. PATENT DOCUMENTS

| | | | |
|---|---|---|---|
| 4,928,252 | * | 5/1990 | Gabbe et al. ........................ 707/525 |
| 5,179,650 | * | 1/1993 | Fulcui et al. ........................ 395/748 |
| 5,475,475 | * | 12/1995 | Kohtani et al. ...................... 358/450 |
| 5,685,002 | * | 11/1997 | Sano ..................................... 358/450 |
| 5,768,488 | * | 6/1998 | Stone et al. ......................... 358/450 |
| 5,777,753 | * | 7/1998 | Mcshane et al. .................... 358/450 |
| 5,867,279 | * | 2/1999 | Funamizu et al. ................... 358/296 |

FOREIGN PATENT DOCUMENTS

| | | |
|---|---|---|
| 6-183095 | 7/1994 | (JP) . |
| 7-148990 | 6/1995 | (JP) . |

\* cited by examiner

*Primary Examiner*—Amelia Au
*Assistant Examiner*—Jingge Wu
(74) *Attorney, Agent, or Firm*—Sidley & Austin (57) ABSTRACT

An print processing device capable of realizing image data editing in which all pieces of original image to be printed are apportioned into an appropriate number of pieces per page and output on the number of pages desired by a user. The device acquires a value designated by the user which specifies the number of printing pages "P", and calculates layout quantity "n" of original images per page based on the number of printing pages "P" corresponding to the acquired designated value and the total number of original images "N". Then, the device generates print data for individual pages describing a print image arranging layout quantity "n" or a smaller number of the original images by apportioning "N" pieces of original image into the calculated layout quantity "n" per page.

15 Claims, 8 Drawing Sheets

PRINT PROCESSING DEVICE FOR IMAGE DATA EDITING

CROSS-REFERENCE TO RELATED APPLICATIONS

This application is based on application No. HEI 9-284809 filed in Japan, the contents of which are hereby incorporated by reference.

BACKGROUND OF THE INVENTION

1. Field of the Invention

The present invention relates to a print processing device for executing image data editing in which multiple pages of original images are arranged and printed on a single sheet, and is applicable to a stand-alone or network printing system or a facsimile system or the like.

2. Description of the Related Art

A modified printing function (termed an n-up function) which arranges and prints n pages (n≧2) of images on a single sheet has been proposed as a supplementary function in document data printing (Japanese Laid-Open Patent Applications HEI 6-183095, HEI 7-148990). Condensing information pertaining to multiple pages onto one page reduces the number of sheets used and facilitates the storage and management of printed documents. For example, designating a value of n allowing an entire multiple page document to be accommodated on one sheet eliminates the time and trouble of binding printed sheets together with a staple or clip. Such a modified printing function is ideal when one wishes to retain as a personal memo a document created with a data processing device or received through electronic mail.

In conventional modified printing, the number of original images to be printed on one sheet (layout quantity n) is made a user-designated item, the magnification of the original images is changed (usually reduced) based on the designated layout quantity n and the size of the sheets, and the image data to be arranged on a printed page is processed.

A conventional system entails a problem in that a user must designate an optimal layout quantity n corresponding to the number of pages (number of original images) of document data to be printed. For example, if 4 is designated as layout quantity n while there are 2 pages of original document data, original images are reduced to ¼, and half of a sheet is left blank.

Particularly if one wishes to use no more than a certain number of sheets, the number of pages must be ascertained and layout quantity n must be calculated. In other words, if one wishes to condense information onto one sheet and layout quantity n is designated as 2 while there are 3 pages, printing will take place on 2 sheets.

SUMMARY OF THE INVENTION

An object of the present invention is to offer an improved print processing device which solves the aforementioned several problems.

A further object of the invention is to offer a print processing device which brings about modified printing wherein all image data pertaining to pages to be printed is output on a number of sheets desired by a user.

The aforementioned several objects are achieved by offering a print processing device for executing image data editing in which multiple original images are arranged and printed on a single page, comprising:

means for acquiring a designated value specifying number of printing pages "P";

means for calculating layout quantity "n" of original images per page based on the number of printing pages "P" corresponding to an acquired designated value and the total number of original images "N"; and means for apportioning "N" pieces of original image into the calculated layout quantity "n" per page so as to generate print data for individual pages describing a print image arranging layout quantity "n" or a smaller number of the original images.

In the aforementioned print processing device, it is further preferable that the generating means apportions the "N" pieces of original image into the calculated layout quantity "n" per page in order of page number so as to generate print data for individual pages describing a print image in which layout quantity "n" or a smaller number of the original images are arranged according to previously determined rules.

The aforementioned print processing device may also be equipped with means for acquiring data indicating single-sided printing in which an image is to be printed on only one surface of one sheet or duplex printing in which images are to be printed on both the front and reverse of one sheet and means for designating the number of printing pages "P" as a value twice that of the acquired designated value in an instance of the duplex printing. In this case, the designated value is the number of sheets on which images are to be printed.

The aforementioned print processing device may also be made to generate a warning or to increase number of printing pages "P" and recalculate the layout quantity "n", when the calculated layout quantity "n" has exceeded a previously determined upper limit value.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

An ideal preferred embodiment of the present invention is described below with reference to the accompanying drawings.

Figure 1:
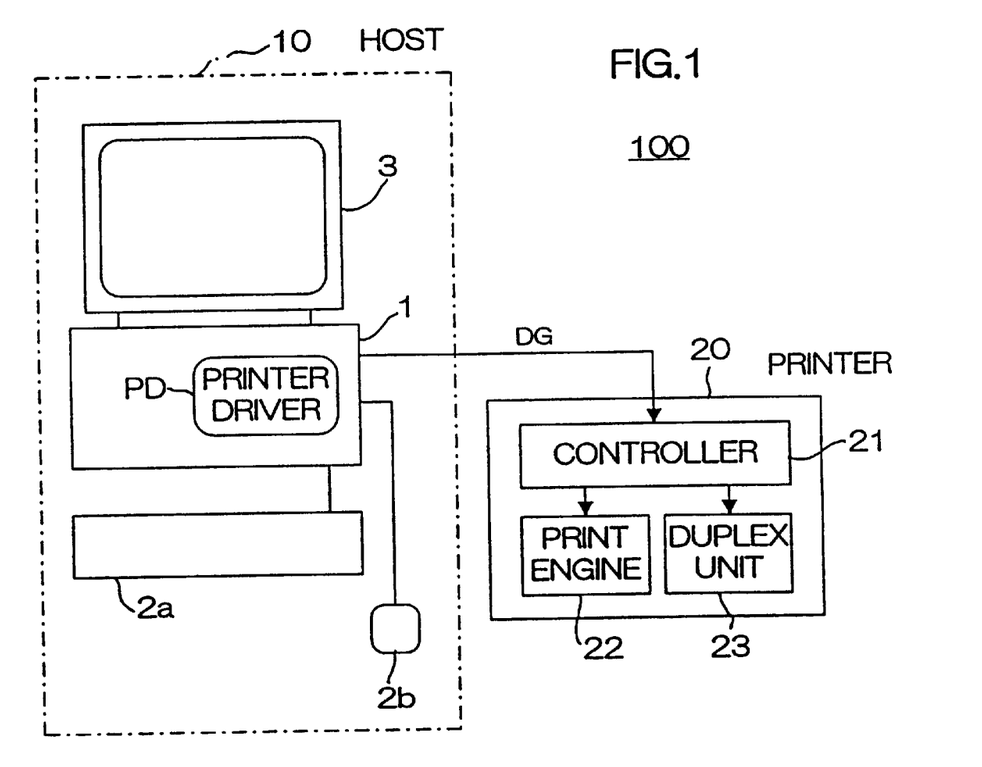
FIG. 1 is a structural drawing of a print system relating to the present invention.
Figure 2A:
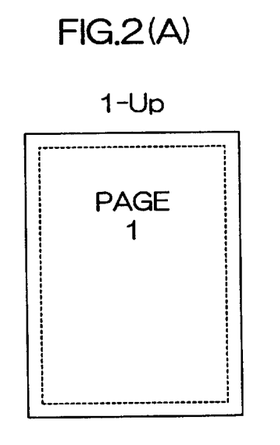
FIG. 2(A) through FIG. 2(E) are drawings illustrating layout pattern selection choices for modified printing.
Figure 2B:
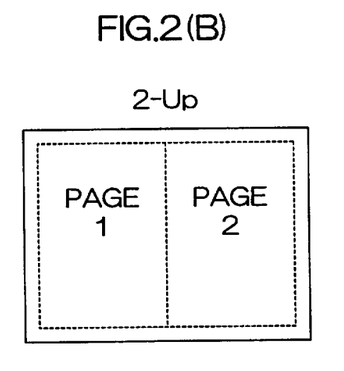
Figure 2C:
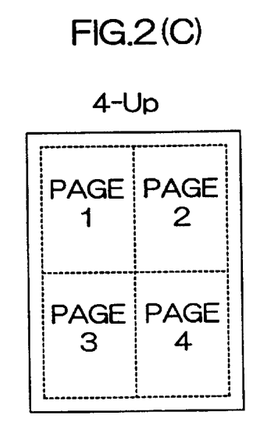
Figure 2D:
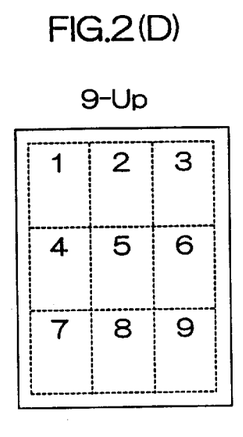
Figure 2E:
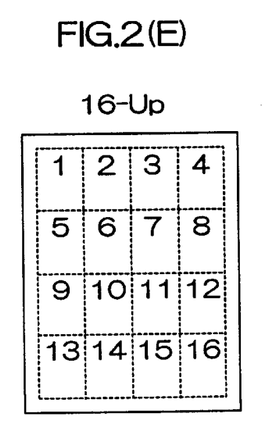

FIG. 1 is a structural drawing of print system 100 relating to the present invention.

Print system 100 comprises host 10 which outputs print data DG describing an image to be printed, and printer 20 which analyzes print data DG and prints the image.

Host 10 comprises personal computer 1 serving as a print processing device pertaining to the present invention, keyboard 2a, pointing device 2b, and display 3. Printer driver PD which is software effecting print processing unique to the present invention is installed in personal computer 1 as part of an operating system. Specifically, printer driver PD is stored on a ROM, hard disk, or other recording medium.

Printer 20 is a page printer possessing controller 21 which has a data processing function, print engine 22 which renders image data visible by an electrophotographic method, and duplex unit 23 for printing on the front and reverse of a sheet.

A user of print system 100 can designate modified printing which collects multiple pages of original images on one page by using host 10 to perform a predetermined operation.

Figure 3:
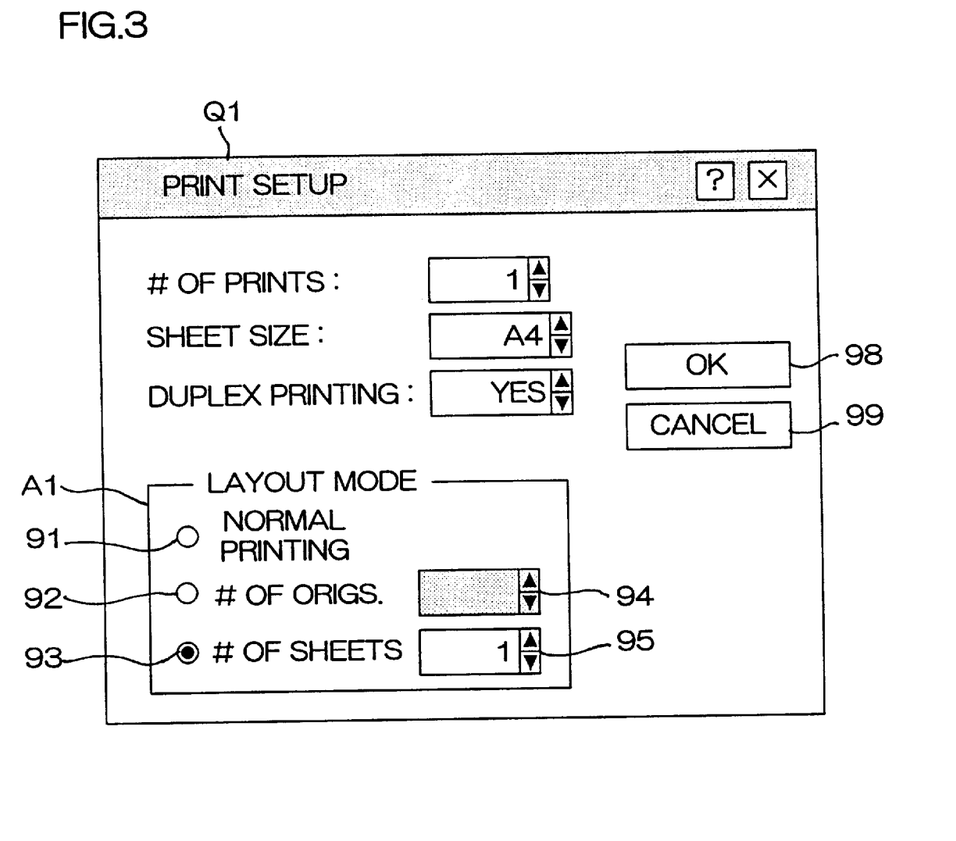
FIG. 3 is a drawing illustrating one example of a print setup screen.

FIG. 2(A) through FIG. 2(E) are drawings illustrating layout pattern selection choices for modified printing, and FIG. 3 is a drawing illustrating one example of print setup screen Q1.

The present preferred embodiment supports the five layout patterns in FIG. 2(A) through FIG. 2(E). The layout pattern in FIG. 2(A) positions one original image on one sheet, and when this pattern is applied, enlargement or reduction corresponding to the relative relationship between image size and sheet size is carried out such that printing takes place on the entire sheet (excluding the margin area). The number of images laid out in individual layout patterns pertaining to FIG. 2(B) through FIG. 2(E) is 2, 4, 9, and 16 in that order, and the layout sequence and position of original images in each layout pattern is established as shown in the drawings. When n, the number of original images to be printed per single page (document page number), is not a standard number (1, 2, 4, 9, or 16), the layout pattern with the smallest layout quantity greater than n is applied. For example, if n were 3, the 2×2 arrangement pattern in FIG. 2(C) with a layout quantity of 4 would be adopted.

As FIG. 3 illustrates, area A1 at the bottom of print setup screen Q1 is provided with three radio buttons 91, 92, and 93 and two combination boxes 94 and 95 used to designate a print image layout mode. In the figure, radio button 93 is turned on and combination box 95 is active.

When a user desires normal printing using a single sheet for each page of document data, radio button 91 is activated. When modified printing is desired, either radio button 92 or 93 is activated. In other words, the number of original images to be laid out on a single sheet is designated, as in the past, or the number of sheets is designated, as the present invention provides. Desired values are designated using said combination boxes 94 and 95. When radio button 92 is activated to designate a layout quantity, a selection may be made from the aforementioned five standard values (1, 2, 4, 9, or 16). When radio button 93 is activated to designate a number of sheets, attention must be paid to the fact that the total number of sheets available for printing changes in single-sided printing and duplex printing.

A user initiates printing by designating basic printing conditions (number of prints, sheet size, optional duplex printing), designating modified conditions as needed, and then activating OK button 98. If cancel button 99 is activated, print processing is terminated.

Figure 4:
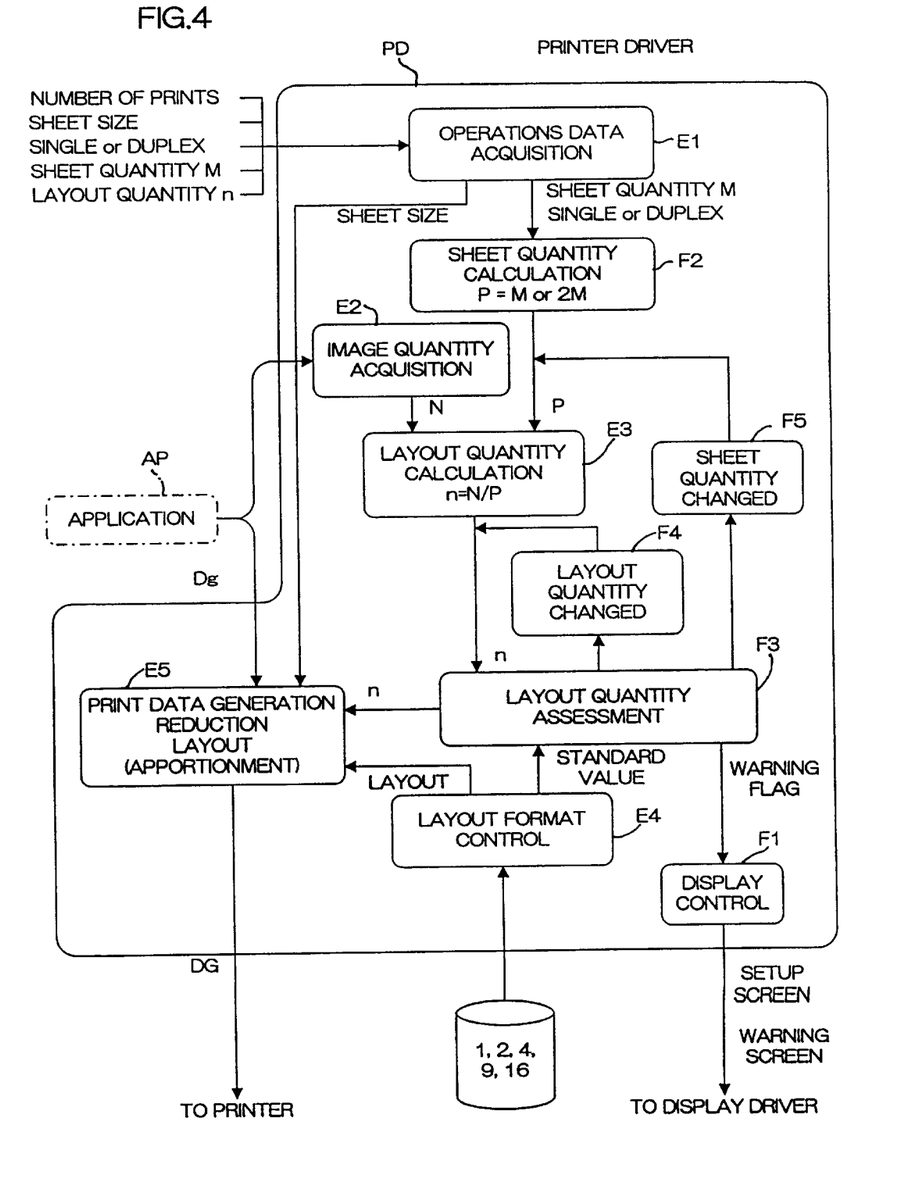
FIG. 4 is a block diagram of the function of a portion of a printer driver relating to the present invention.

FIG. 4 is a block diagram of the function of a portion of printer driver PD relating to the present invention.

When application software AP presents a print job, display controller F1 first displays the above-discussed print setup screen Q1. In strict terms, a display driver is responsible for display. The content of the operation is transmitted to operations data acquisition unit E1, and designated sheet quantity M and duplex printing selection status are presented to sheet quantity calculator F2.

In single-sided printing, sheet quantity calculator F2 sets the page quantity P (number of physical pages) to designated sheet quantity M, and in duplex printing, sheet quantity calculator F2 sets page quantity P to a value twice that of designated sheet quantity M. Page quantity P is sent to layout calculating unit E3.

Image quantity acquisition unit E2 acquires original image quantity N (number of theoretical pages) based on job data Dg from software application AP, and said unit provides said quantity to layout calculating unit E3.

Layout calculating unit E3 calculates layout quantity n per page based on original image quantity N and page quantity P. At such time, division of N/P is performed, and any decimal of the quotient rounded up to an integer is taken as n. The calculated layout quantity n is reported to layout quantity assessment unit F3.

Layout quantity assessment unit F3 assesses whether layout quantity n matches a standard value received from layout format controller E4. In the case of a match, layout quantity n is sent to print data generator E5 without modification. In the case of no match, layout change unit F4 changes layout quantity n to the smallest value among standard values greater than layout quantity n and sends that value to print data generator E5. For example, if N=6 and P=2, the value calculated by layout calculating unit E3 is 3 (=6/2), and layout quantity n is changed from 3 to 4.

Print data generator E5 apportions N pages of original images described by job data Dg to sheets, in page number order, layout quantity n at a time, generating print data DG which describes one or multiple pages of print images wherein layout quantity n or fewer original images are arranged in accordance with a corresponding layout pattern. At such time, original image magnification is changed to correspond to the sheet size reported by operations data acquisition unit E1 and layout quantity n.

In addition to these functional elements, printer driver PD is provided with sheet quantity change unit F5. When all original images cannot be printed on designated sheet quantity M, sheet quantity change unit F5 increases designated sheet quantity M. Because sheet quantity M then differs from the value designated by a user, display controller F1 displays a warning informing a user of that fact. A user can direct printing to be executed or to be cancelled.

Figure 5:
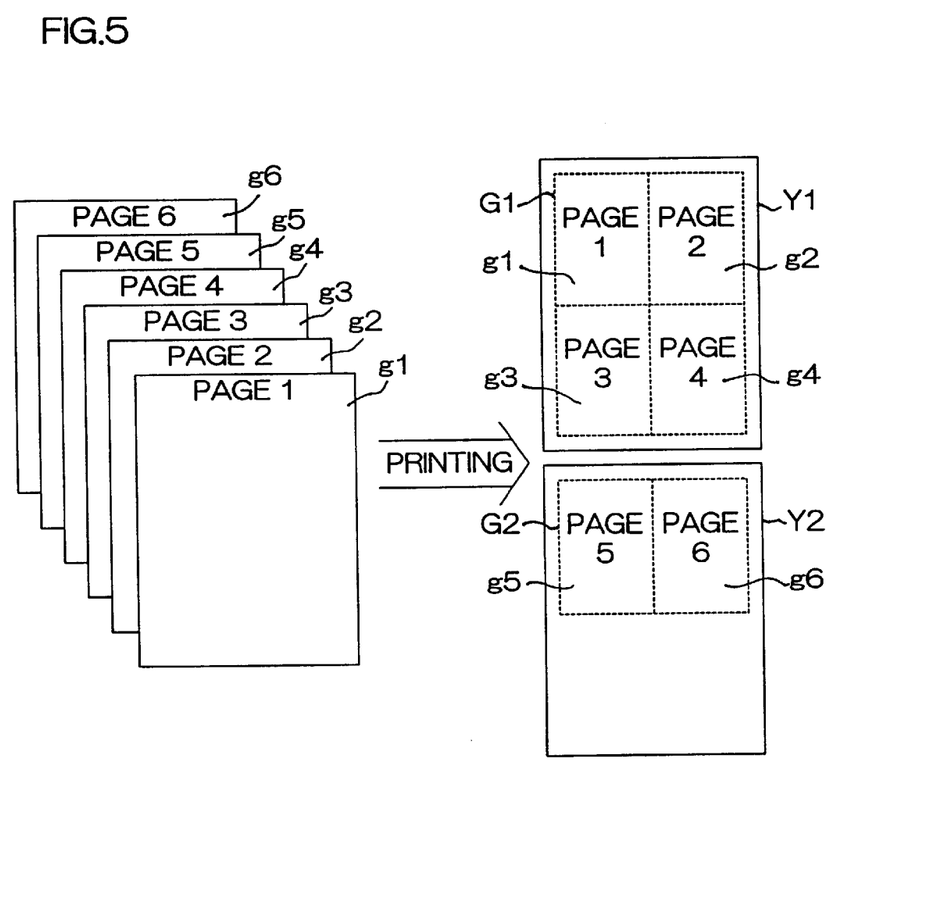
FIG. 5 is a drawing illustrating one example of modified printing.

FIG. 5 is a drawing illustrating one example of modified printing.

In the example in FIG. 5, print image G1 arranging original images g1 through g4 pertaining to the first through the fourth page among six pages of original images g1 through g6 is printed on first page Y1, and print image G2 arranging original images g5 and g6 pertaining to the remaining fifth and sixth pages is printed on second page Y2. Although half of page Y2 is blank, each magnification of the original images g1 through g6 is uniformized to avoid an imbalance of data and thus improve appearance. The magnification on the final page Y2 can nevertheless be given a value different from that of additional page Y1. In an instance of single-sided printing, page Y1 corresponds to a surface of a first sheet, and page Y2 corresponds to a surface of a second sheet. In an instance of duplex printing, page Y2 corresponds to the reverse of page Y1 in one sheet.

Figure 6:
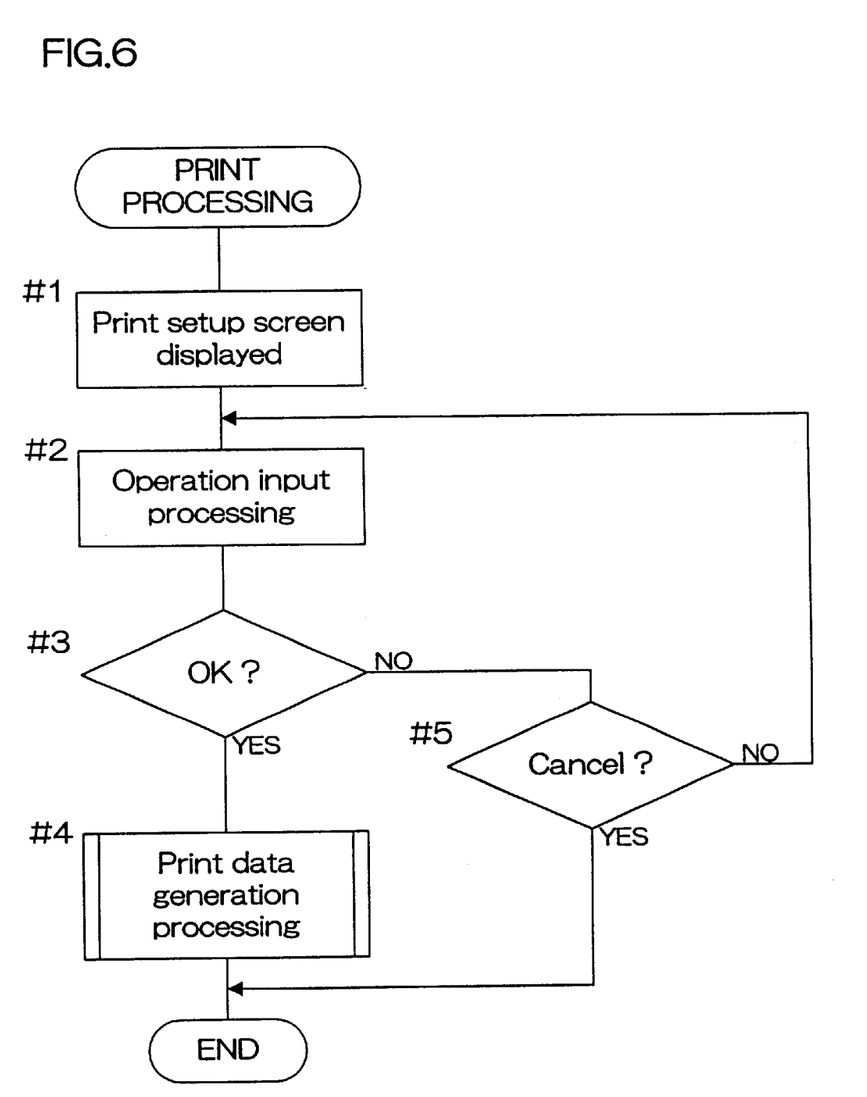
FIG. 6 is a flow chart of print processing in a host.

FIG. 6 is a flow chart of print processing in host 10.

Print setup screen Q1 is displayed (#1), and designations for various items are accepted (#2). When OK button 98 is activated, processing for print data generation is performed (#3, #4), and when cancel button 99 is activated, processing ends (#5).

Figure 7A:
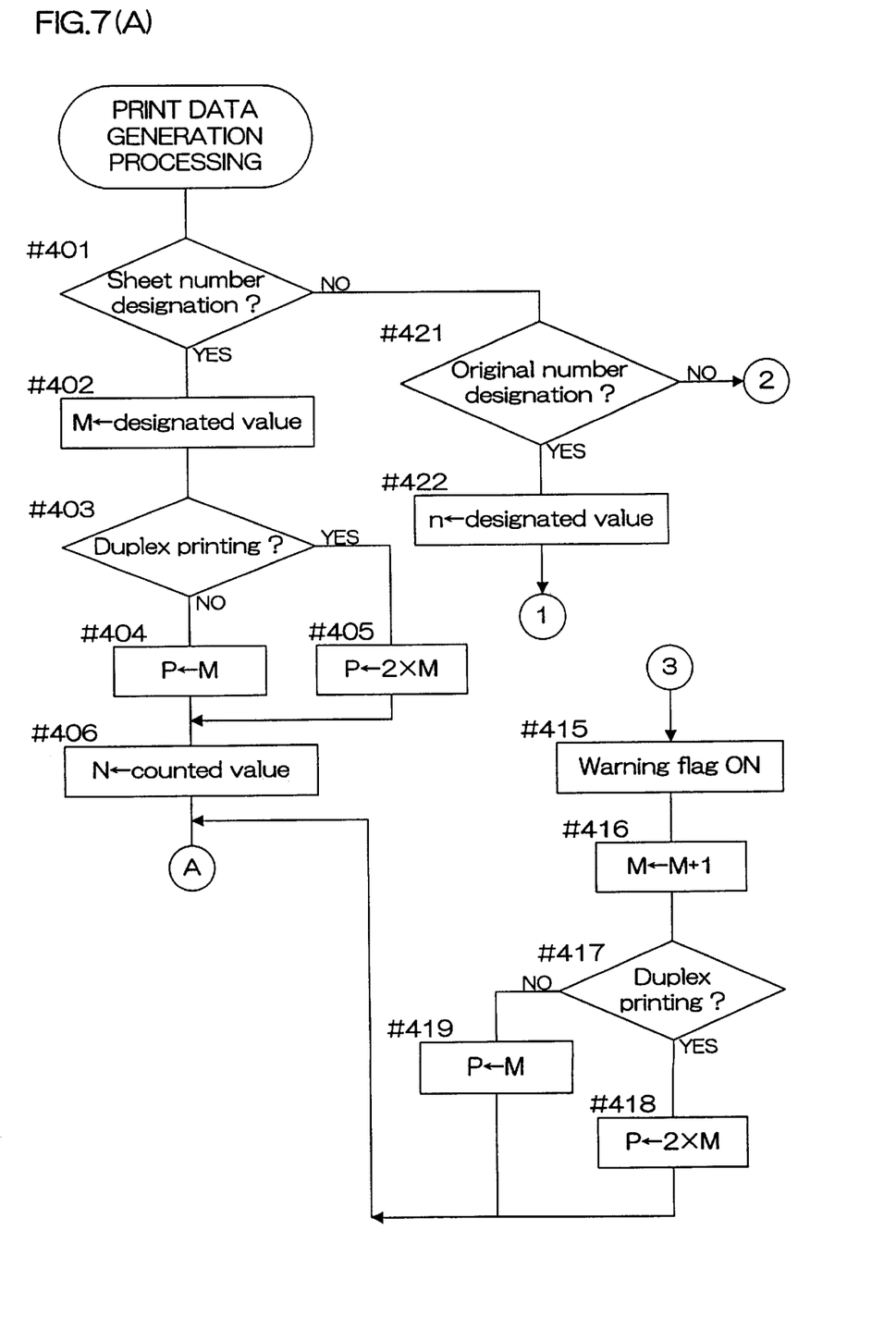
FIG. 7(A) and FIG. 7(B) are a flow chart of a processing subroutine for print data generation pertaining to FIG. 6.
Figure 7B:
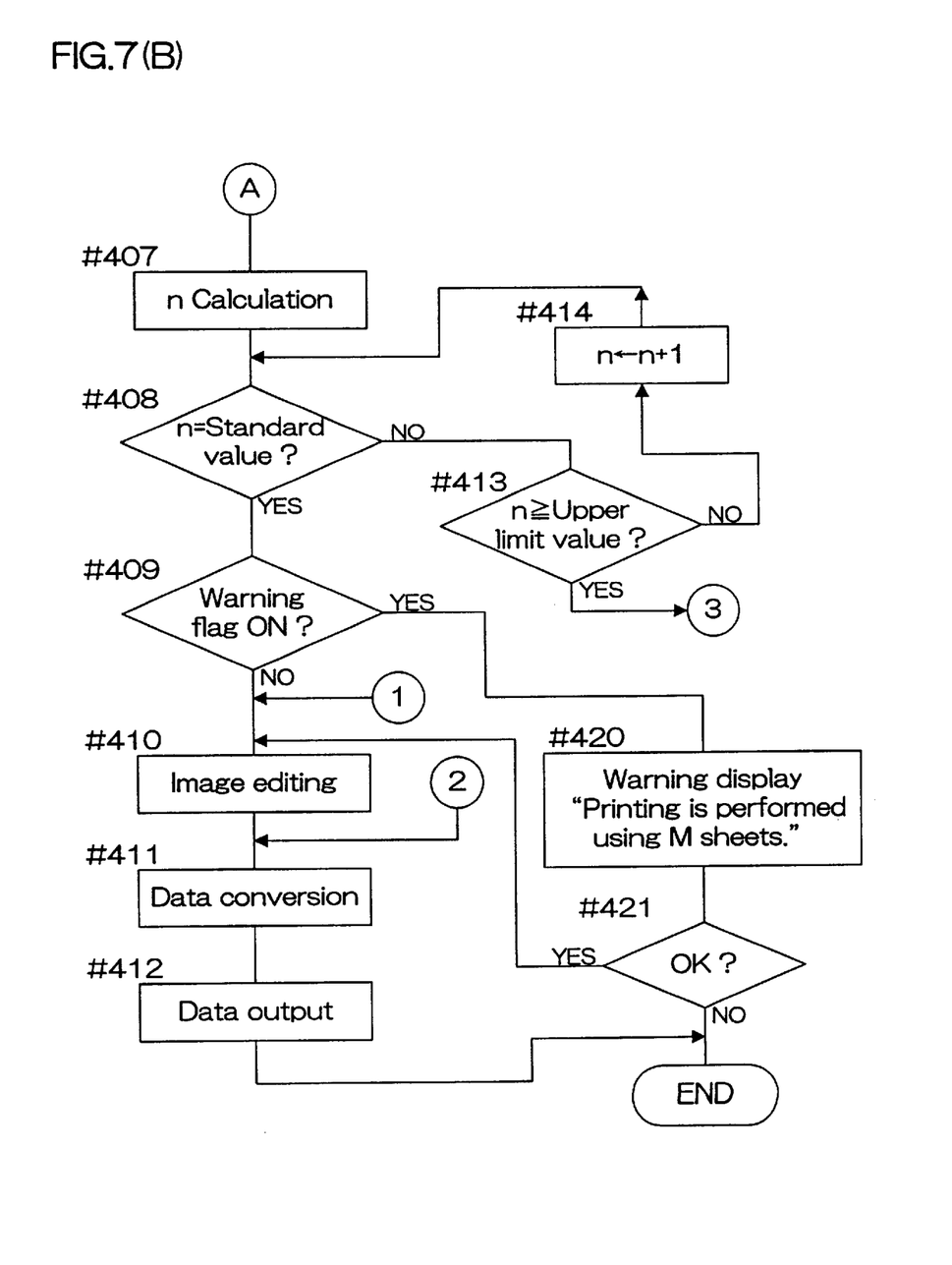

FIG. 7(A) and FIG. 7(B) are a flow chart of a processing subroutine for print data generation pertaining to FIG. 6.

Operation information pertaining to radio buttons 91–93 is checked (#401, #421). In normal printing (NO at #401 and #421), processing moves to step #411, and job data Dg is converted to a data format compatible with printer 20. Print data DG wherein information designating basic printing conditions has been added to the converted data is then output to printer 20 (#412).

In modified printing in which a user designates layout quantity n (YES at #421), layout quantity n is adopted as a designated value (#422). Processing then moves to step #410 and image editing is carried out in which a quantity of N original images is laid out on sheets, in batches of layout quantity n. Print data DG for an obtained, predetermined number of pages then undergoes data conversion as in an instance of normal printing and is output to printer 20 (#411, #412).

In modified printing unique to the present invention in which the user designates sheet quantity M (YES at #401), sheet quantity M is first adopted as a designated value (#402). In a case of single-sided printing (NO at #403), page quantity P is set to sheet quantity M (#404), and in a case of duplex printing (YES at #403), page quantity P is set to a value twice that of sheet quantity M (#405). The number of pages is counted by analyzing job data Dg, and the result of the count is taken as the number of original images to be printed N (#406).

Layout quantity n is calculated as described above based on the number of original images N and page quantity P (#407), and a check is made as to whether layout quantity n is a standard value for a layout pattern in FIG. 2 (#408). If layout quantity n is a standard value (YES at #408), a warning flag described hereafter is off after confirming image editing is performed (#409, #410). The content of image editing is similar to that in an instance of modified printing wherein a layout quantity is designated. When editing is complete, print data DG pertaining to the obtained, predetermined number of pages undergoes data conversion as in the case of normal printing and is output to printer 20 (#411, #412).

If the check at step #408 returns "no", layout quantity n is incremented by 1 (#414), and the check is made again (#408). Incrementation and checking is repeated until layout quantity n matches a standard value or reaches an upper limit value (16 in the present example) (#408, #413, #414). If layout quantity n has reached an upper limit value (YES at #413), processing proceeds to step #415 and a warning flag is turned on. Sheet quantity M is then incremented by 1 (#416), and page quantity P corresponding to the incremented sheet quantity M is calculated, with consideration given to the selection status of duplex printing (#417 through #419). Processing then returns to step #407, layout quantity n is calculated based on the new page quantity P, layout quantity n is increased in units of 1 as before (#414), and when a standard value is matched (YES at #408), the warning flag is checked (#409). In this instance, the warning flag is on (YES at #409), and a warning is therefore displayed to the effect that the sheet quantity has been changed (#420). Specifically, more sheets than the quantity designated by the user are to be used, and the user is therefore requested to determine whether or not this is acceptable (#421). If approval is indicated (YES at #421), image editing is performed (#410). If cancellation is indicated (NO at #421), processing ends.

The above-described present preferred embodiment ensures that even without previously ascertaining the number of pages N in a document which a user desires to print, the designation of a printed result represented by a a number of sheets corresponding to a certain number of pages (sheets) or less than a certain number of pages on which printing is desired obtains a printed result consisting of a designated number of sheets whereon a number of pages n is automatically reduced and laid out on one page (one sheet). The number of printed pages is therefore not increased without need, and document storage and management is facilitated.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

By way of example, the foregoing preferred embodiment was described as performing image editing on a host side, but controller 21 of printer 20 can also be made to perform image editing. There are no limitations on layout pattern examples, and the upper limit value of layout quantity n may be greater than 16. Processing procedures may be modified to generate a warning when the sheet size is small or a reduction rate otherwise becomes less than a preset value even if layout quantity n is smaller than an upper limit value, and to request that a user select either printing at that reduction rate or an increase in the number of sheets (or a switch from single-sided printing to duplex printing) to alleviate reduction. The upper limit value may also be made to switch to a small value when sheet size is small.

What is claimed is:

1. A print processing device for executing image data editing, in which "N" original images, where "N" is greater than one, are arranged and printed on a single sheet, said print processing device comprising:

means for acquiring a designated value specifying a number of printed sheets "P";

means for calculating a layout quantity "n" of original images per printed sheet based on the number of printed sheets "P" corresponding to the acquired designated value and the total number of original images "N"; and means for apportioning said "N" original images into said "P" printed sheets, each printed sheet having as a maximum quantity the calculated layout quantity "n" original images.

2. A print processing device as claimed in claim 1, wherein said means for apportioning the "N" original images into the "P" printed sheets apportions said images according to specified rules for image arrangement.

3. A print processing device as claimed in claim 1, further comprising:

means for acquiring data indicating one of single-sided printing, in which images are to be printed on only one surface of a sheet, and duplex printing, in which images are to be printed on both the front and reverse of a sheet; and means for designating the number of printed sheets "P", for purposes of computing the layout quantity "n", as a value twice that of the acquired designated value in an instance of the duplex printing, said acquired designated value being the number of sheets on which images are to be printed.

4. A print processing device as claimed in claim 1, further comprising means for generating a warning when the calculated layout quantity "n" has exceeded a previously determined upper limit value.

5. A print processing device as claimed in claim 1, further comprising means for increasing number of printing pages "P" and recalculating the layout quantity "n" when the calculated layout quantity "n" has exceeded a previously determined upper limit value.

6. A method for executing image data editing, in images, where "N" is greater than one, are arranged and printed on a single sheet, said method comprising the steps of:

acquiring a designated value specifying a number of printed sheets "P";

calculating a layout quantity "n" of original images per printed sheet based on the number of printed sheets "P" corresponding to the acquired designated value and the total number of original images "N"; and apportioning said "N" original images into said "P" printed sheets, each printed sheet having the calculated layout quantity "n" or fewer original images.

7. A method as claimed in claim 6, wherein said apportioning step apportions the "N" original images into the "P" printed sheets according to specified rules for image arrangement.

8. A method as claimed in claim 6, further comprising the steps of:

acquiring data indicating one of single-sided printing, in which images are to be printed on only one surface of a sheet, and duplex printing, in which images are to be printed on both the front and reverse of a sheet; and designating the number of printed sheets "P", for purposes of computing the layout quantity "n", as a value twice that of the acquired designated value in an instance of the duplex printing, said acquired designated value being the number of sheets on which images are to be printed.

9. A method as claimed in claim 6, further comprising a step of generating a warning when the calculated layout quantity "n" has exceeded a previously determined upper limit value.

10. A method as claimed in claim 6, further comprising a step of increasing number of printing pages "P" and recalculating the layout quantity "n" when the calculated layout quantity "n" has exceeded a previously determined upper limit value.

11. A computer program product for executing image data editing, in which "N" original images, where "N" is greater than one, are arranged and printed on a single sheet, said computer program product comprising:

means for acquiring a designated value specifying a number of printed sheets "P";

means for calculating a layout quantity "n" of original images per printed sheet based on the number of printed sheets "P" corresponding to the acquired designated value. and the total number of original images "N"; and means for apportioning said "N" original images into said "P" printed sheets, each printed sheet having as a maximum quantity the calculated layout quantity "n" original images.

12. A computer program product as claimed in claim 11, wherein said means for apportioning the "N" original images into the "P" printed sheets apportions said images according to specified rules for image arrangement.

13. A computer program product as claimed in claim 11, further comprising:

means for acquiring data indicating one of single-sided printing, in which images are to be printed on only one surface of a sheet, and duplex printing, in which images are to be printed on both the front and reverse of a sheet; and means for designating the number of printed sheets "P", for purposes of computing the layout quantity "n", as a value twice that of the acquired designated value in an instance of the duplex printing, said acquired designated value being the number of sheets on which images are to be printed.

14. A computer program product as claimed in claim 11, further comprising means for generating a warning when the calculated layout quantity "n" has exceeded a previously determined upper limit value.

15. A computer program product as claimed in claim 11, further comprising means for increasing number of printed sheets "P" and recalculating the layout quantity "n" when the calculated layout quantity "n" has exceeded a previously determined upper limit value.

* * * * *

UNITED STATES PATENT AND TRADEMARK OFFICE
CERTIFICATE OF CORRECTION

PATENT NO. : 6,188,490 B1
DATED : February 13, 2001
INVENTOR(S) : Kiyoshi Miyake Page 1 of 1

It is certified that error appears in the above-identified patent and that said Letters Patent is hereby corrected as shown below:

Column 7,
Line 9, delete "printing", and insert -- printed --.
Lines 13 and 14, delete "editing, in images, where "N" is greater than one,", and insert -- editing, in which "N" original images, where "N" is greater than one, --.
Line 47, delete "printing pages", and insert -- printed sheets --.

Column 8,
Line 13, after "value", delete ".", and insert -- , --.

Signed and Sealed this

Twenty-fifth Day of December, 2001

Attest:

Attesting Officer

JAMES E. ROGAN
Director of the United States Patent and Trademark Office